UNITED STATES PATENT OFFICE 2,688,617

SULFONATED DIHALOGENO DIAMINO-STILBENES

Delton W. Hein, Somerville, N. J., and Wyvona A. Lane, Washington, D. C., assignors to American Cyanamid Company, New York, N. Y., a corporation of Maine No Drawing. Application July 17, 1951,
Serial No. 237,298

7 Claims. (Cl. 260—249.6)

The present invention concerns a new series of acylated halogeno-stilbene compounds useful as fluorescent brighteners and their production. More specifically they constitute sulfonic acids and sulfonates of compounds of the general formula

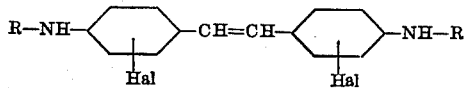

in which R is the residue of an acylating agent, attached to the amino nitrogen by a carbon to nitrogen bond; Hal is a halogen radical, preferably chlorine; and the sulfonic or sulfonate substituents may be in the stilbene nucleus or in the R grouping or both.

It is often convenient to isolate and use these sulfonic acids in the form of their ammonium or alkali metal salts, and these salts are meant to be included, as obvious equivalents, whenever the compounds are mentioned.

These brighteners combine to an extraordinarily high degree the desirable properties of fluorescent power, affinity, hypochlorite resistance, and freedom from tendency to discolor either detergents or fabrics. In the past, in preparing brighteners, it has generally been necessary to compromise on certain of these qualities. This has been particularly true of hypochlorite bleach resistance and discoloration of detergents, which are particularly weak points with ordinary brighteners of the diaminostilbenedisulfonic acid type.

The brighteners of the present invention, however, are quite free from these drawbacks. They show not only a high degree of affinity and fluorescent power but are surprisingly free from any tendency to discolor either detergents or fabrics. They also have an excellent hypochlorite fastness, so that they can be applied before or during the bleaching operation without any difficulty.

The compounds of the present invention can be prepared by different methods depending on the sulfonating operation. The latter may be carried out either before or after acylation. For example, to obtain products sulfonated in the stilbene nucleus, a dichlorodiaminostilbenedisulfonic acid, such as those disclosed and claimed in the copending application of Lane and Hein for U. S. Letters Patent, Serial No. 237,305, filed of even date, can be reacted, either in an aqueous or anhydrous medium, according to known methods, with an acylating agent.

It is an advantage of the present invention that a very wide variety of acylating agents may be used. Examples of such acylating agents are anhydrides such as acetic anhydride, maleic anhydride, and phthalic anhydride; acid halides such as butyryl chloride, trifluoroacetyl chloride, adipyl chloride, crotonyl chloride, ethoxyacetyl chloride, benzoyl and phenylacetyl chloride and the alkyl, halo, nitro, amino, and oxygenated substitution products thereof, the naphthoyl chlorides, 2-hydroxy - 3 - naphthoyl chloride, phenoxyacetyl chloride, cinnamoyl chloride, diethyl carbamyl chloride, hydrocinnamoyl chloride, hexahydrobenzoyl chloride, cyclohexylacetyl chloride, furoyl chloride, nicotinyl chloride, picolinyl chloride, and thiophene alpha carboxylic acid chloride; substituted carbamyl chlorides and related carbamic acid derivatives such as the phenyl and naphthyl isocyanates and isothiocyanates; heterocyclic acylating agents such as cyanuric chloride and chloropyrimidines. Residual active halogen in the last mentioned bifunctional or trifunctional acylating agents can then be replaced by substituted amino or oxy groups, such as anilino, phenoxy, and the like.

Particularly valuable products are given by acylating with chlorides of benzoic acid and its substitution products, especially the loweralkoxy substitution products, such as the isomeric anisic and ethoxybenzoic acids, 2,5-dimethoxybenzoic acid, o-propoxybenzoic acid, o-i-butoxybenzoic acid, 2,4-diethoxybenzoic acid, 2-methoxy - 3 - methylbenzoic acid, p-butoxybenzoic acid, 3-ethoxy-4-methoxybenzoic acid, 3,4,5-triethoxybenzoic acid, 2,4,5-trimethoxybenzoic acid, 4-methyl-2-ethoxybenzoic acid, and the like. With these alkoxy-benzoic acids, particularly the polyalkoxy derivatives, the acylation is best carried out in an anhydrous solvent solution. Anhydrous pyridine, for example, is an excellent solvent because of the sensitivity of these acid chlorides to hydrolysis. These products constitute a preferred embodiment of the present invention.

It is equally possible to obtain products which are sulfonated, not in the stilbene nucleus, but in the portion of the molecule represented by R in the above formula. This can be done by reacting a dichlorodiaminostilbene with an aromatic acylating agent, such as one of those mentioned above, and then sulfonating the product.

Utilization of the compounds of this invention is not limited to treatment of any particular fibers, they being useful with both animal and vegetable fibers and synthetic fibers such as rayon. Celanese, nylon and the like. Nor are they limited to treatment of textile fabrics. They may also be beneficially used in the manufacture of paper and felt products, transparent or translucent sheets or pellicles of cellulose, and white or light colored leathers and the like. Their usefulness also extends to mutually compatible varnishes, plastic coatings, and white or colored plastic shapes. They have a particularly good affinity and compatibility with amino-plast resins.

The following examples will illustrate a number of the procedures which can be used to obtain these compounds, and will give further information as to their properties. All parts are by weight and temperatures in degrees Centigrade unless otherwise specified.

*Example 1*

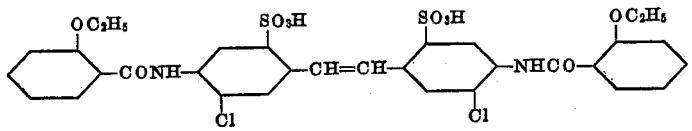

A mixture of 15 parts of 5,5'-dichloro-4,4'-diamino-stilbene-2,2'-disulfonic acid and 735 parts of dry pyridine is stirred and refluxed and gradually treated with 37.6 parts of o-ethoxybenzoyl chloride. Refluxing and stirring are continued until free primary amino groups are no longer present. The reaction mixture is drowned in approximately 700 parts of water, together with enough sodium carbonate to give a weakly alkaline reaction. Twenty parts of salt are added and the solution is steam-distilled to remove the pyridine. The residual slurry is filtered at room temperature, washed with 2% salt solution, and dried at 100°. An excellent yield of very light cream-colored solid is obtained.

This product has outstanding qualities as a brightener, conferring strong bluish fluorescence upon cotton cloth from dilute water or soap solution. It is readily incorporated in soap or synthetic detergents without effect on their appearance. It is particularly noteworthy for its resistance to hypochlorite bleach; for example, in one test it loses only 15% of its strength while, under the same conditions, the bis-o-ethoxybenzoyl derivative of 4,4'-diaminostilbene-2,2'-disulfonic acid, which is a substantially weaker brightener to begin with, loses 60% in strength.

*Example 2*

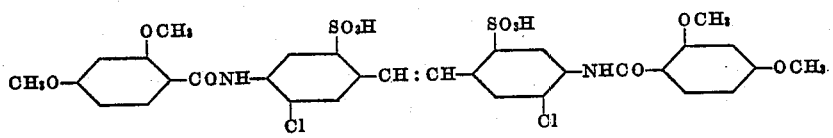

A mixture of 10.9 parts of 2,4-dimethoxybenzoic acid and 9 parts of thionyl chloride is allowed to react at room temperature, excess thionyl chloride then being removed by evacuation. The resulting 2,4 - dimethoxybenzoyl chloride is added to a slurry of 4.4 parts of 5,5'-dichloro-4,4'-diaminostilbene-2,2'-disulfonic acid in 147 parts of pyridine. The mixture is refluxed until acylation is complete and then worked up in the manner described in the preceding example. A high yield of very pale yellow solid is obtained.

This product is a brightener of excellent properties. Its high strength is still further increased by its unusual degree of affinity; for example, at concentrations of 0.25%, it is approximately 50% stronger than the bis-(2,4-dimethoxybenzoyl) derivative of 4,4'-diaminostilbene-2,2'-disulfonic acid. It is also of outstanding bleach fastness, losing only 18% of its strength in a hypochlorite bath under conditions that destroy 60% of the strength of the above mentioned diaminostilbenedisulfonic acid compound.

*Example 3*

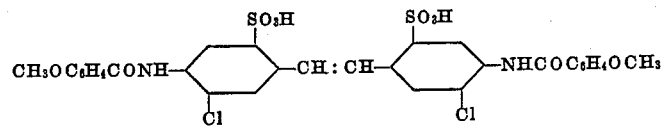

32.8 parts of di-o-tolylguanidine is dissolved in 88.5 parts of water containing 13.6 parts of concentrated hydrochloric acid. The resulting solution is filtered and diluted to the volume of 250 parts of water.

7.3 parts of 5,5'-dichloro-4,4'-diaminostilbene-2,2'-disulfonic acid is dissolved in 50 parts of water by the addition of just sufficient 5N sodium hydroxide to give a clear solution. This is gradually added to a solution of 18.5 parts by volume of the above prepared di-o-tolylguanidine hydrochloride solution and 25 parts of water. The resulting white crystalline di-o-tolylguanidine salt of 5,5'-dichloro-4,4'-diaminostilbene-2,2'-disulfonic acid is filtered, washed with water, and dried at 60° C. It melts at 292–293° C. (dec.).

A slurry of 60 parts of nitrobenzene and 3.9 parts of the above prepared di-o-tolylguanidine salt is heated to 125° C. and treated with 2.4 parts of anisoyl chloride. The reaction is completed at 160° C. There is then added a solution of 12 parts of alcohol and 5.9 parts of 5N sodium hydroxide solution. The resulting slurry is stirred and filtered. The cake is washed with nitrobenzene, slurried in 200 parts of water, containing 10 parts of salt, and steamed free of nitrobenzene. The product, obtained as disodium salt, is then filtered, washed with dilute sodium carbonate solution, followed by water, and dried at 50° C. It is a fine pale yellow crystalline solid of excellent properties as a brightener.

*Example 4*

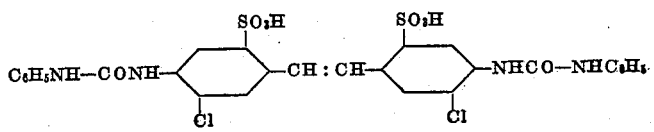

4.4 parts of 5,5'-dichloro-4,4'-diaminostilbene-2,2'-disulfonic acid is slurried in 100 cc. of water and treated with just enough sodium carbonate to effect solution. The resulting solution is heated to 40° C. and treated gradually with 4.8 parts of phenyl isocyanate. After prolonged stirring, the mixture is treated with an additional 100 parts of water and heated to 90° C. It is then cooled and filtered. The cake is washed with 2% salt solution and dried at 100° C. The product is a white solid with excellent brightener properties.

*Example 5*

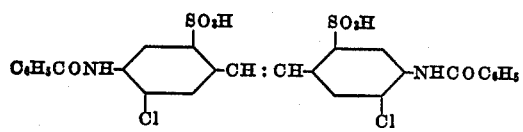

A slurry of 4.4 parts of 5,5'-dichloro-4,4'-diamino-stilbene-2,2'-disulfonic acid and 147 parts of dry pyridine is stirred and refluxed and gradually treated with 8.4 parts of benzoyl chloride. Stirring and heating are continued until acylation is complete, as shown by absence of primary amino groups. The reaction mixture is then drowned in approximately 200 parts of water, made weakly alkaline with sodium carbonate, and freed of pyridine by steam distillation. The product, in the form of its disodium salt, is filtered, washed with 50 parts of 2% salt solution, followed by 50 parts of ice water, and dried at 100° C.

*Example 6*

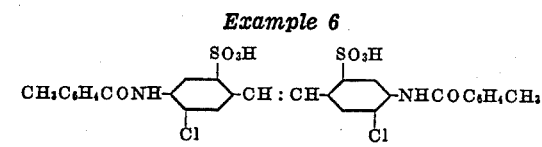

The procedure of the preceding example is followed, except that the benzoyl chloride is replaced by 9.27 parts of mixed isomeric toluyl chlorides. The disodium salt of product is obtained in excellent yield as a light yellow solid.

*Example 7*

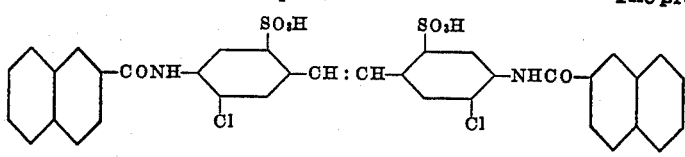

A mixture of 2.2 parts of 5,5'-dichloro-4,4'-diaminostilbene-2,2'-disulfonic acid and 2.9 parts of beta-naphthoyl chloride in 98 parts of dry pyridine is stirred and refluxed until acylation is complete, and worked up as described above. A very high yield of light yellow product is obtained.

*Example 8*

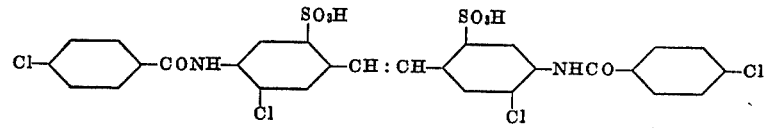

A mixture of 2.6 parts of 5,5'-dichloro-4,4'-diaminostilbene-2,2'-disulfonic acid and 5.3 parts of 4-chlorobenzoyl chloride in 98 parts of dry pyridine is reacted and worked up substantially as described in the preceding examples. An exceedingly high yield of product is obtained in the form of a white solid.

*Example 9*

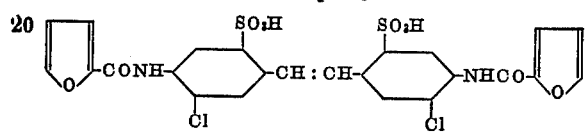

The procedure of the preceding examples is used to react 4.4 parts of 5,5'-dichloro-4,4'-diaminostilbene-2,2'-disulfonic acid and 7.8 parts of furoyl chloride in 147 parts of dry pyridine. The product is obtained in the form of a white solid.

*Example 10*

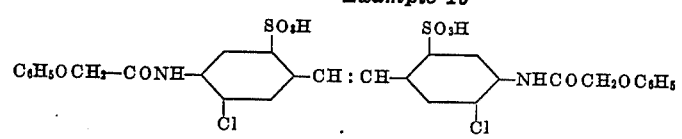

The procedure of the preceding examples is used to react 4.4 parts of 5,5'-dichloro-4,4'-diaminostilbene-2,2'-disulfonic acid and 10.2 parts of phenoxyacetyl chloride in 147 parts of dry pyridine. The product is obtained as a white solid.

*Example 11*

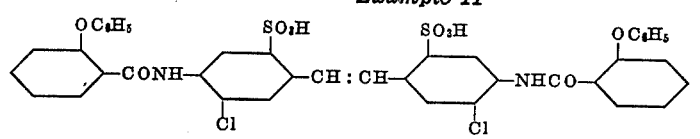

12.8 parts of o-phenoxybenzoic acid is converted to acid chloride by refluxing with thionyl chloride, excess of the latter then being removed by distillation at reduced pressure. The product is reacted with 4.4 parts of 5,5'-dichloro-4,4'-diaminostilbene-2,2'-disulfonic acid in 147 parts of dry pyridine, according to the procedure of the preceding examples. An excellent yield of pale yellow product is obtained.

*Example 12*

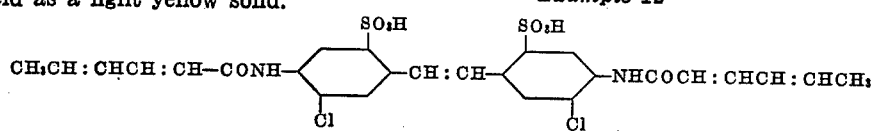

The procedure of the preceding examples is used to react 4.4 parts of 5,5'-dichloro-4,4'-diaminostilbene-2,2'-disulfonic acid and 7.8 parts of sorboyl chloride in 147 parts of dry pyridine. An excellent yield of product is obtained.

Example 13

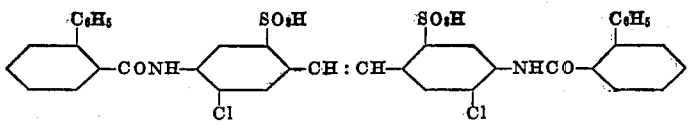

11.9 parts of o-phenylbenzoic acid is converted to acid chloride by treatment with thionyl chloride, followed by distillation under reduced pressure to remove the excess. The acid chloride is reacted, as described in the preceding examples, with 4.4 parts of 5,5'-dichloro-4,4'-diaminostilbene-2,2'-disulfonic acid in 147 parts of dry pyridine. A very good yield of product is obtained.

Example 14

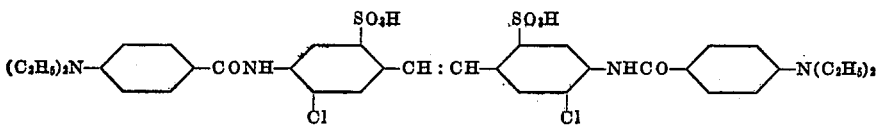

7.14 parts of purified thionyl chloride is slowly added, with stirring, to 147 parts of dry pyridine. To this is slowly added 11.6 parts of p-diethylaminobenzoic acid. The solution is stirred for a short time at 45° C. and then treated with 4.4 parts of 5,5'-dichloro-4,4'-diaminostilbene-2,2'-disulfonic acid. Acylation is completed under reflux and the reaction drowned into 150 parts of water containing enough sodium carbonate to give a weakly alkaline mixture. The pyridine is removed by steam distillation. The product, a pale yellow solid, is filtered at room temperature, washed with 2% salt solution, and dried at 100°.

Example 15

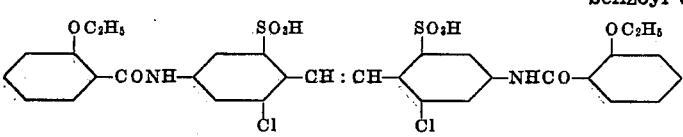

A mixture of 1.5 parts of 6,6'-dichloro-4,4'-diaminostilbene-2,2'-disulfonic acid and 98 parts of dry pyridine is heated to the boil and gradually treated with 2.4 parts of o-ethoxybenzoyl chloride. Refluxing is continued until free amino groups are no longer detectable. The reaction mixture is then drowned in 50 parts of water containing 5 parts of salt and 1.5 parts of sodium carbonate, and steam-distilled to remove the pyridine. The residual solution is cooled to room temperature and filtered. The cake is washed with 2% salt solution and dried at 100°. A high yield of product is obtained.

Example 16

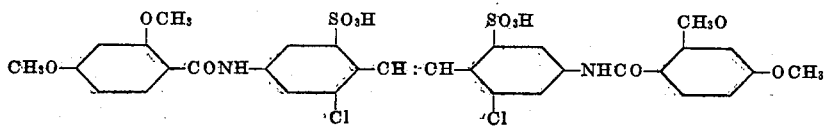

A slurry of 1.1 parts of 6,6'-dichloro-4,4'-diaminostilbene-2,2'-disulfonic acid in 74 parts of dry pyridine is heated to the boil and treated with a solution of 2.0 parts of 2,4-dimethoxybenzoyl chloride in 5.5 parts of dry chlorobenzene. When acylation is complete, the solution is poured into 50 parts of water containing 1.1 parts of sodium carbonate and 5 parts of salt. After steam distillation, the residual solution is cooled and filtered. The product is washed with 2% salt solution and dried at 100° C. It is obtained in excellent yield.

Example 17

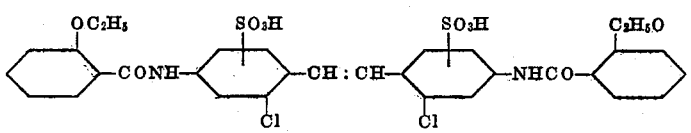

6.3 parts of 2,2'-dichloro-4,4'-diaminostilbene is stirred for one-half hour at 120–130° with 28.6 parts of 20% oleum. The reaction mixture is then diluted with 120 parts of ice and filtered. The sulfonation product obtained is washed with water and dried at 100° C.

6.9 parts of the above prepared product is heated to the boil with 295 parts of dry pyridine and gradually treated with 8.7 parts of o-ethoxybenzoyl chloride. Acylation is completed under reflux. The mixture is then added to 300 parts of water containing 10 parts of salt and 5.3 parts of sodium carbonate. The pyridine is removed by steam distillation, and the product crystallized on cooling. It is filtered and dried.

Example 18

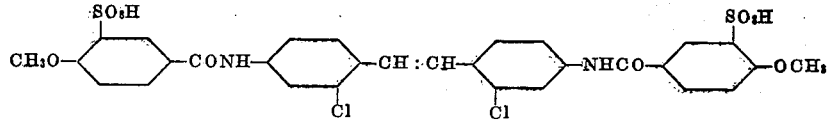

A mixture of 11.2 parts of 2,2'-dichloro-4,4'-diaminostilbene and 110 parts of chlorobenzene is heated to the boil and treated with 16.3 parts of anisoyl chloride. This is followed by 6.2 parts of pyridine, stirring under reflux being continued until acylation is complete. The reaction mixture is steam-stripped and filtered hot. The product is washed with hot water and dried at 50° C. A quantitative yield of 4,4'-dianisoyl-amino-2,2'-dichlorostilbene is obtained.

6.4 parts of the above prepared product is added over a period of one-half hour to 27.2 parts of chlorosulfonic acid at a temperature below 5° C. After three hours at 0–5° C., the reaction mixture is poured on excess ice. The resulting solution is made up to 20% salt concentration and the product filtered and dried.

*Example 19*

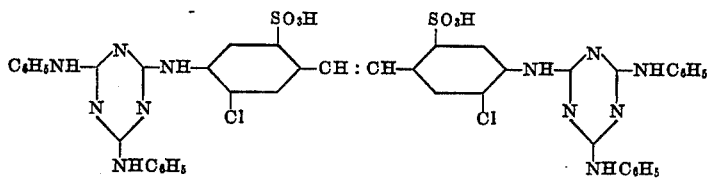

A slurry of 4.4 parts of 5,5'-dichloro-4,4'-di-aminostilbene-2,2'-disulfonic acid in 90 parts of water is dissolved by the addition of just enough 10% aqueous sodium carbonate to give a weakly alkaline solution. The resulting solution is cooled to 0° and slowly treated at this temperature with a solution of 3.7 parts of cyanuric chloride in 63 parts of acetone. The acidity is adjusted as necessary by periodic addition of 10% sodium carbonate solution. When free amino groups are no longer detectable in the solution, 18.6 parts of aniline are added, and the mixture is heated to the boil. Distillation is continued until the boiling point reaches 99° C., the distillate being replaced by the gradual addition of 100 parts of water to the mixture. Again 18.6 parts of aniline are added, and the mixture refluxed for 45 minutes. The product is filtered at room temperature, washed with 2% salt solution and dried at 100°. A very high yield of product is obtained. It has excellent brightener characteristics.

We claim:

1. A sulfonated dihalogeno diaminostilbene having the formula

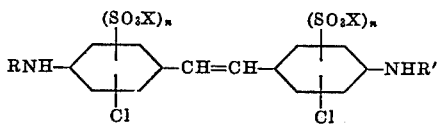

wherein R and R' are acyl radicals selected from the group consisting of organic carboxylic acyl radicals, symmetrical triazinyl radicals, and the radical R''—NH—C=O in which R'' is an carbocyclic aromatic radical of less than three rings; X is selected from the group consisting of H, NH₄, and the alkali metals; n is an integer of not more than one and there being at least one sulfonate substituent on R or R' when n is zero.

2. A sulfonated dihalogeno diaminostilbene having the formula

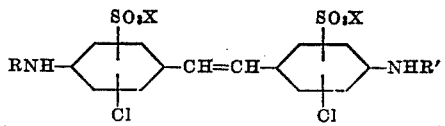

in which R and R' are aromatic carboxylic acyl radicals and X is selected from the group consisting of H, NH₄ and the alkali metals.

3. A sulfonated dihalogeno diaminostilbene having the formula

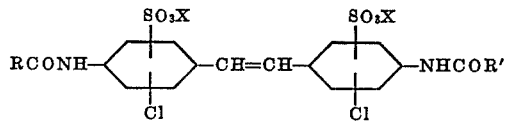

in which R and R' are carbocyclic aromatic radicals of less than three rings and X is selected from the group consisting of H, NH₄ and the alkali metals.

4. A sulfonated dihalogeno diaminostilbene having the formula

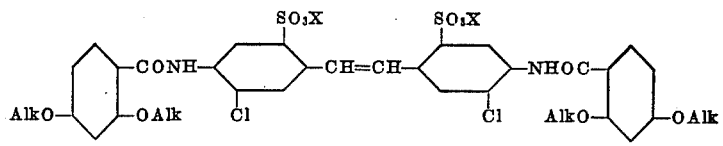

in which Alk is a lower alkyl radical and X is selected from the group consisting of H, NH₄ and the alkali metals.

5. A sulfonated dihalogeno diaminostilbene having the formula

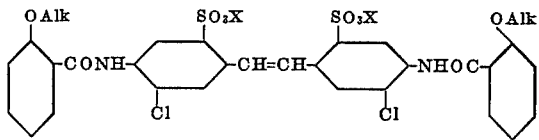

in which Alk is a lower alkyl radical and X is selected from the group consisting of H, NH₄ and the alkali metals.

6. A sulfonated dihalogeno diaminostilbene having the formula

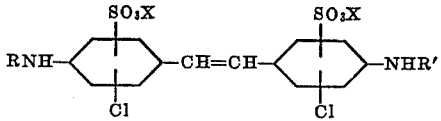

in which R and R' are symmetrical triazinyl radicals and X is selected from the group consisting of H, NH₄ and the alkali metals.

7. A sulfonated dihalogeno diaminostilbene having the formula

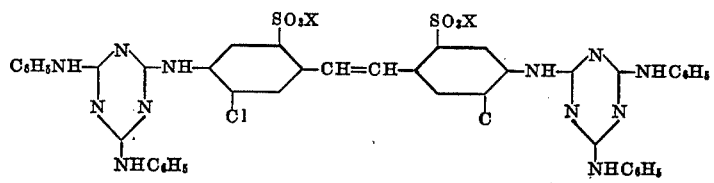

and X is selected from the group consisting of H, NH₄ and the alkali metals.

References Cited in the file of this patent

UNITED STATES PATENTS

| Number | Name | Date |
|---|---|---|
| 2,376,743 | Wendt | May 22, 1945 |
| 2,468,431 | Eberhart et al. | Apr. 26, 1949 |
| 2,580,234 | Lecher et al. | Dec. 25, 1951 |
| 2,581,057 | Wirth et al. | Jan. 1, 1952 |
| 2,581,059 | Witte | Jan. 1, 1952 |

OTHER REFERENCES

Berichte, vol. 46, pp. 1235-6 (1913).